United States Patent

[11] 3,592,102

| [72] | Inventor | Charles William Berthiez |
| | | 5 Avenue Eglantine, Lausanne, Switzerland |
| [21] | Appl. No. | 793,716 |
| [22] | Filed | Jan. 24, 1969 |
| [45] | Patented | July 13, 1971 |
| [32] | Priority | Feb. 2, 1968 |
| [33] | | France |
| [31] | | 138,559 |

[54] ROTATABLE INDEXING PLATE FOR A MACHINE TOOL
8 Claims, 8 Drawing Figs.

[52] U.S. Cl. .................................................. 90/56 R,
90/58 R, 74/826
[51] Int. Cl. .................................................. B23d 7/08
[50] Field of Search ............................................. 90/58, 58.2,
58.3, 56, 11; 51/240, 240 R; 74/826

[56] References Cited
UNITED STATES PATENTS
2,666,367 1/1954 Berthiez .................... 90/58
FOREIGN PATENTS
185,004 8/1922 Great Britain .............. 90/58

*Primary Examiner*—Gil Weidenfeld
*Attorney*—Ward, McElhannon, Brooks & Fitzpatrick

ABSTRACT: An indexing plate for a machine tool rotatable about a vertical axis on a support resting in a foundation including horizontal support surface means positioned in the foundation, vertical jack means are mounted between said support surface means and the periphery of said plate and said jack means are capable of simultaneously contacting said support surface means and said plate to support said plate. In one embodiment four jacks are provided in the plate whose axes pass through the plane of the plate at the corners of a square centered on the axis of rotation of the plate and the support surface means includes four support shoes mounted in pairs on rails.

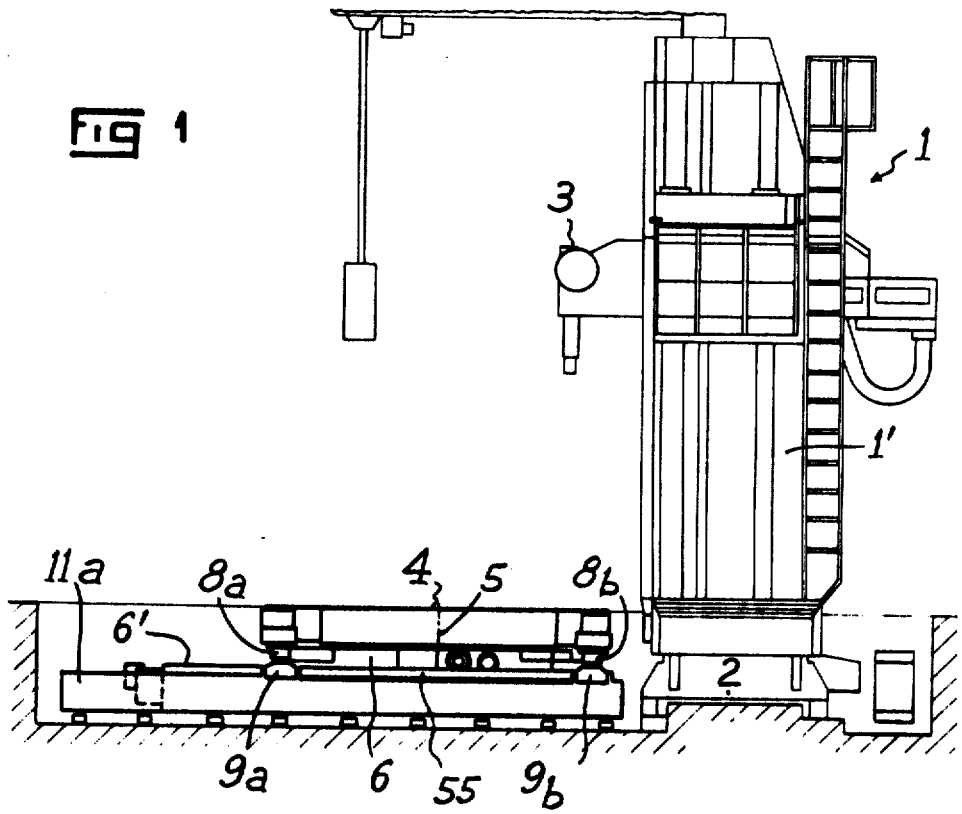
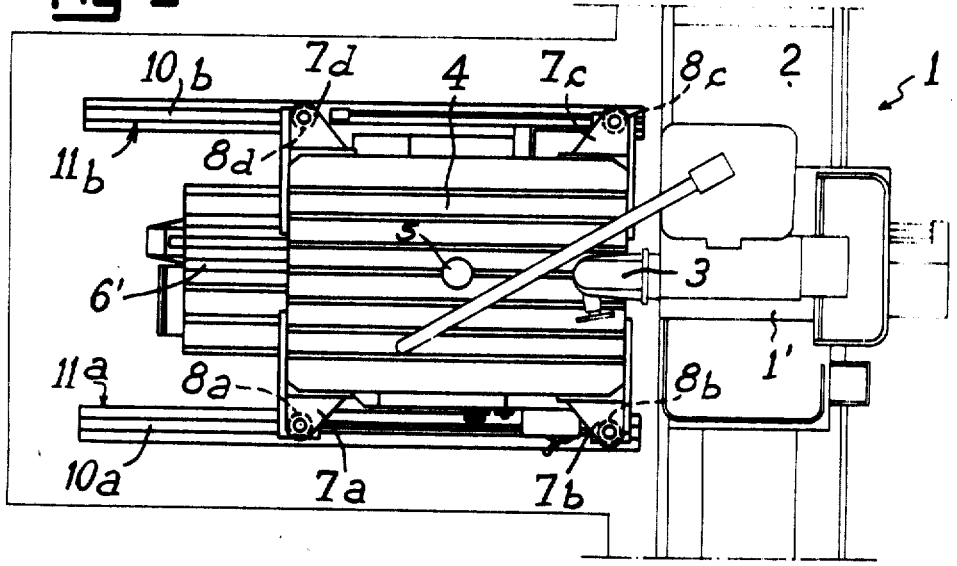

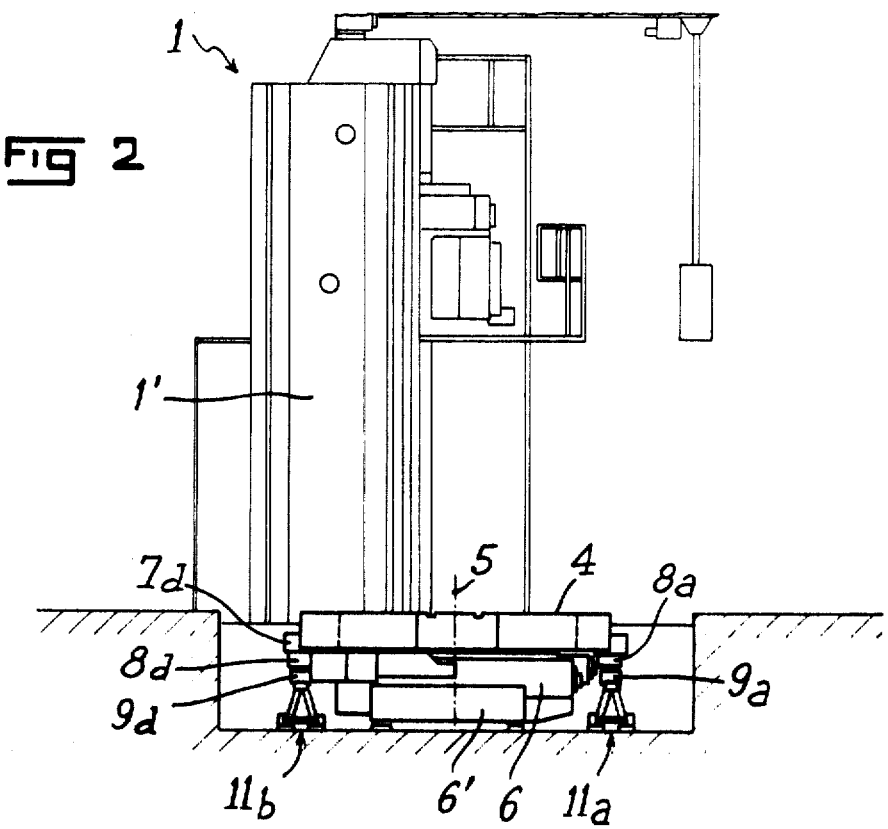
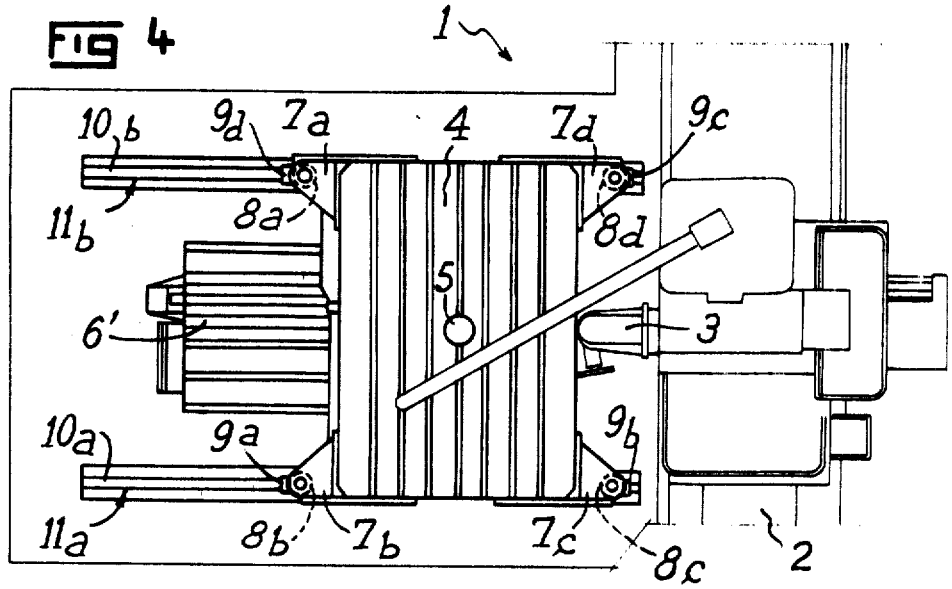

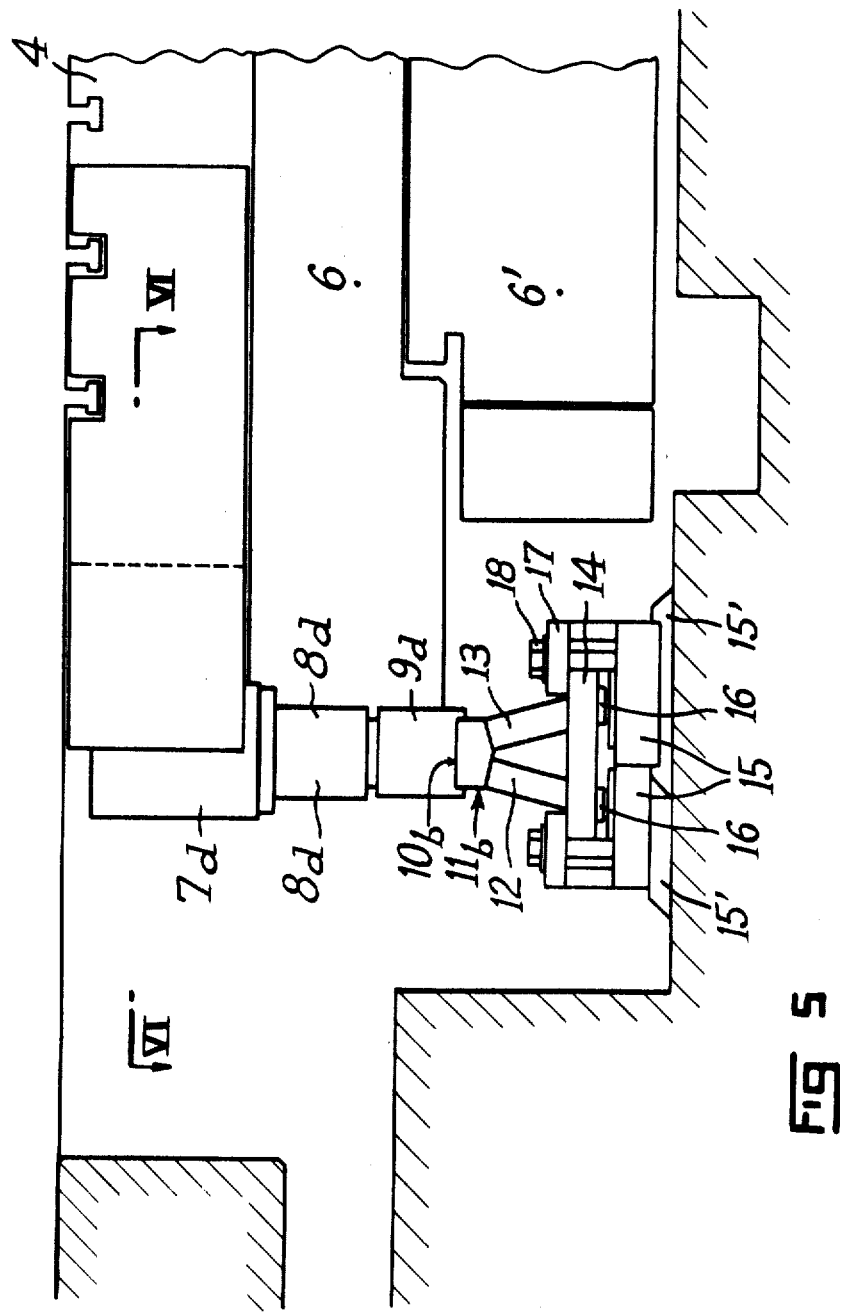

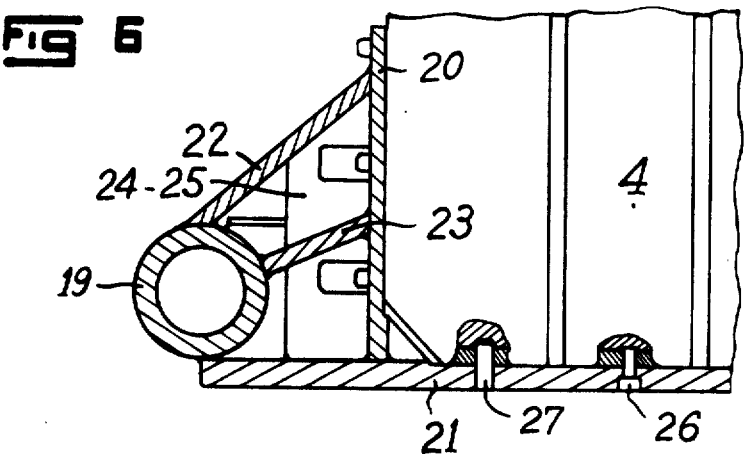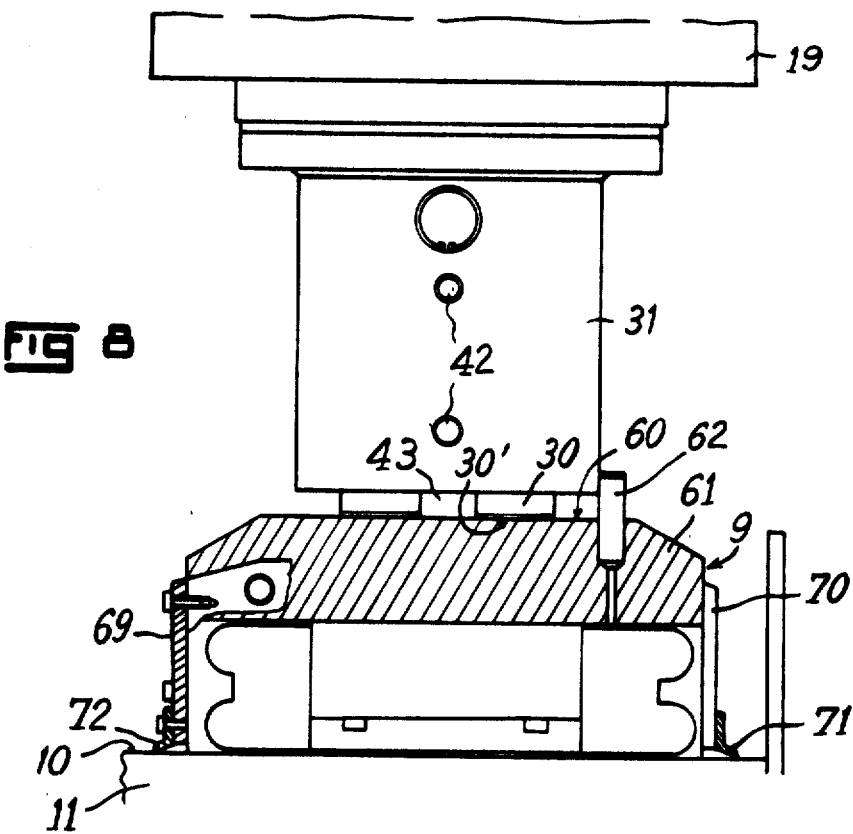

ROTATABLE INDEXING PLATE FOR A MACHINE TOOL

The present invention is directed to a rotatable indexing plate for a machine tool adapted to support workpieces in the course of machining. Specifically, the indexing plate is adapted to position the several faces of the workpiece to the machine tool by selected angular movements. The plate is rotatably mounted on a support and is provided with means to fix by precise guide marks the angular position of the plate with respect to the machine tool. These plates are generally utilized in combination with horizontal boring-milling machines. The support for the plate is then movable along a bed.

If the machine tool is of the floor type, having an upright or column which is movable transversely with respect to the spindle, the plate is movable on its bed parallel to the spindle. In the case of a planer-type machine, the upright may be fixedly mounted or movably mounted parallel to the spindle and the plate is movable on its bed in a transverse direction with respect to the spindle. Typically, the manufacturers provide several-sized plates for the same support and the same bed, in such a manner that the user may be able to choose the size which is most convenient for the dimensions of the largest workpiece which is to be machined.

In the above machines, the support is always the same and the diameter of the circular slides or of the rollers in contact with the plate on its support are consequently the same. This results in the plates of large dimensions having a significant portion of their surface overhanging. Such plates are consequently subject to bending when the workpieces of large dimensions are mounted on the extremities of the plate.

Certain workpieces are unbalanced with respect to their support, that is, their center of gravity is not at the vertical symmetric center of their support, or, for reasons of machining, it is necessary to place the workpieces in a position such that their center of gravity is not at the center of axis of the plate. This causes bending of the plate of varying amounts.

This bending is significant when the overhang of the plate is large and/or when the center of gravity of the workpiece is off centered with respect to the axis of the plate.

Moreover, when the workpiece is unbalanced, the plate has a tendency to tip to the heavier side, thus causing an irregular squeezing of the oil films firstly between the sliders of the plate and the support, then of the support and the bed, which is an addition to inevitable unequal deformation of the two linear supports of the bed on the foundation due to the load.

Thus, the irregular distribution of the forces result in different displacements which, while each may be of small value, leads to significant errors in precision. In order to eliminate this, it has been necessary to straighten or true up the reference faces of the workpiece with respect to the directions of movements of the machine tool, such as truing up by means of shims appropriately distributed under the workpiece support. This operation is all the more difficult to effect when high tolerances are involved. It is necessary to do this with each workpiece having an unbalance with respect to the axis of the plate and it creates in all these situations a significant loss of time which diminishes the productivity of the machine tool associated with the plate and does not enable obtaining with certainty the high tolerances desired.

The present invention has for an object the overcoming of these disadvantages and inconveniences and provides a rotatable indexing plate of large dimension, which is adapted to receive workpieces whose center of gravity is removed from the axis of the plate, while enabling obtaining a high precision of machining on the several faces of the workpiece.

To this end, the present invention provides a rotatable indexing plate for machine tools which is provided at its periphery with jacks adjustable in height whose feet are adapted to come in contact with support surfaces mounted in the foundation pit of the plate. Preferably, the travel of the jacks is limited by stops formed on the plate.

According to a particular embodiment of the invention in the case where the plate is movable in translation on a bed, the support surfaces are movable on parallel rails on the bed.

The invention enables eliminating all shimming of a workpiece to be machined whose center of gravity is not found at the center of axis of the indexing plate. This enables a considerable saving of time. The forces resulting from the unbalance are directly transmitted by the jacks to the support surfaces and to the foundation pit. The adjustment of the height of the jacks in a manner to prevent any tipping of the plate under the influence of such workpieces is effected once and for all, and it is sufficient for each new workpiece merely to move the jacks in their adjusted position in order to obtain a desired positioning of the reference faces of the workpiece with respect to the machine tool. The limitation of the travel of the jacks by a stop enables easily finding the adjusted position.

If the jacks are simply positioned in pairs with respect to the axis of the plate it is possible to precisely effect the machining by turning of the plate. Thus, the jacks are raised after each face is machined, the indexing plate is turned 180°, and the jacks are lowered towards their support surfaces, which thereby eliminates the effects of the shifting of the center of gravity of the workpiece with respect to the axis of the plate. The initial adjustment of the height of the jacks remains unchanged if the support surfaces are similarly positioned symmetrically in pairs with respect to the axis of the plate.

A still more interesting positioning consists in the jacks being at equal angles about a cylinder coaxial with the plate, and the support surfaces being on a plane parallel to the plate and centered on the axis thereof, since this enables using the same adjustment of the jacks for all indexing positions of the plate obtained by circular permutations of the jacks with respect to their support surfaces. This provides high tolerances in machining, and the passage from one position to another is very rapidly made by raising the jacks, turning the plate, then relowering the feet of the jacks on the support surfaces. The height adjustment of the jacks remains the same.

In the case of a square plate, for example, the jacks may be mounted at the four corners. In the case of a rectangular plate, four jacks, there is preferably disposed the jacks in members solidly screwed and clamped on the two parallel faces of the larger sides of the rectangle, in such a manner that the axis of the jacks pass through the plate at the corners of a square centered on the axis of the plate in the plane of the latter.

In the most frequent situation of a circular indexing plate mounted on a support movable on a bed, the support being provided with feeding and positioning movements, there is provided support surfaces carried by rails parallel to the bed. The rails are perfectly levelled in a plane parallel to the plane of the plate.

Preferably, the support surfaces are made on shoes movable on the rails which thus enables the movement of the indexing plate on its bed during the machining while maintaining the jacks in extended position.

In order to effect a complete turning of the workpiece through 180°, or a rotation by permutation of the jacks, the support surfaces are locked on the rails in the selected position, then the jacks are raised and the plate turned, the feet of the jacks being automatically positioned with respect to the support shoes. The jacks are then lowered and the machining continued. After unlocking the shoes on the rails, the plate may be moved on the bed.

In the case of four jacks disposed in a square, for example, the four support shoes may be moved in pairs on a pair of rails on both sides of the bed parallel to the plate.

Many other advantages, features and additional objects of the present invention will become manifest to those versed in the art upon making reference to the detailed description and the accompanying sheets of drawings in which preferred structural embodiments incorporating the principles of the present invention are shown by way of example.

On the drawings:

FIG. 1 is a front elevational view of the plate according to the invention combined with a boring-milling machine of the floor type;

FIG. 2 is a side elevational view of the apparatus of FIG. 1;

FIG. 3 is a top view of the plate in combination with a boring-milling machine of the floor type of FIG. 1;

FIG. 4 is a view similar to FIG. 3 with the plate turned through 90°;

FIG. 5 is a fragmentary enlarged left elevational view of the indexing plate;

FIG. 6 is a view taken along the lines VI-VI of FIG. 5;

FIG. 8 is a reduced scale left elevational view of a portion of the apparatus of FIG. 7 partially in section along the line VIII-VIII of FIG. 7.

As shown in the drawings:

Figure 7:
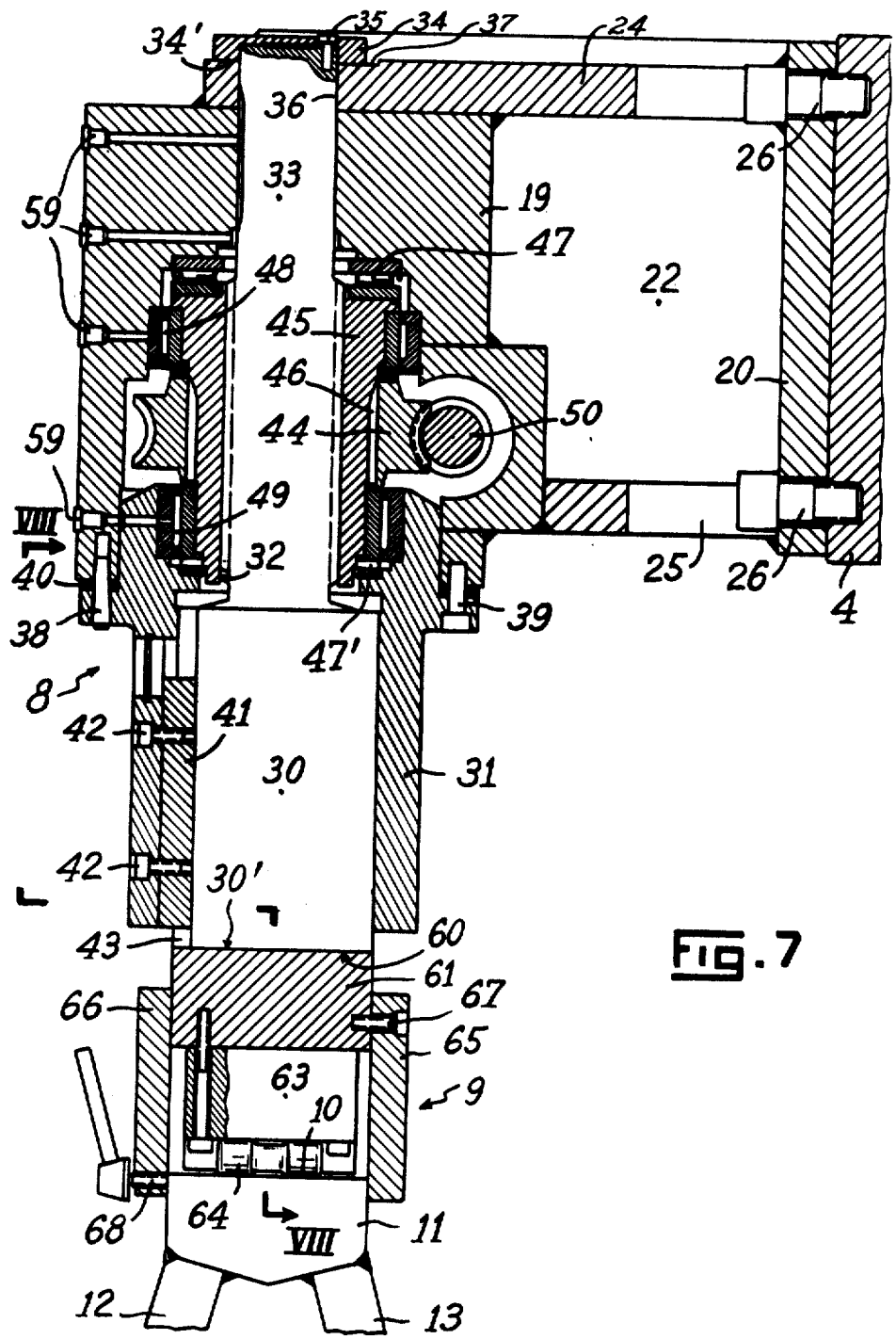
FIG. 7 is a fractional sectional view of a jack supported on a rolling shoe.

In accordance with the present invention there is shown in FIGS. 1 to 4 a horizontal boring and milling machine 1 of the floor type having an upright 1' which is movable along a bed 2 and supplied with a toolholder 3.

A support apparatus for workpieces includes a rotatable indexing plate 4. The plate 4 is rectangular and movable about a vertical axis 5 passing through its center. The plate 4 may be rotatably driven on a support 6 which is itself movable on a bed 6' perpendicularly to the movement of the upright 1'.

The indexing plate 4 has at its four corners supports 7a, 7b, 7c, 7d provided with jacks 8a, 8b, 8c, 8d, whose feet rest on movable shoes 9a, 9b, 9c, 9d respectively. The axis of the jacks 8a, 8b, 8c, 8d pass through the plane of the plate 4 at the corners of a square centered on the axis 5.

The shoes 9a, 9b, 9c, 9d move by means of rolling surfaces 10a, 10b on a pair of parallel rails 11a, 11b, respectively, which are parallel to the bed 6' and mounted in the foundation pit of the indexing plate 4.

As shown in FIG. 4, the plate 4 has been turned through 90° as indicated by the position of the grooves of the plate; it is seen that the supports 7a, 7b, 7c, 7d and thus the jacks 8a, 8b, 8c, 8d, are found after this rotation above shoes 9d, 9a, 9b, 9c, respectively, whose position remains unchanged on the rails 11a and 11b.

In FIG. 5 is shown a portion of the indexing plate 4 resting through the intermediary of a jack 8d and a shoe 9d, on the rolling surface 10b of the rail 11b made of a hard steel. The rolling surface 10b is welded to rail supports 12 and 13 which are attached to a base 14. The base 14 is supported by adjustable height members 16 of jacks 15, positioned staggered in parallel rows on each side of the base 14, and resting on the foundation on a cement bed 15'. The rail 11b is fixedly maintained in place by clamps 17 and bolts 18. The pair of rails 11a and 11b are perfectly levelled in order that their rolling surfaces 10a and 10b are in the same horizontal plane parallel to that of the slides of the support 6 of the plate 4.

As shown in FIG. 6, the supports 7a, 7b, 7c, 7d, have a hollow cylinder 19 attached to the indexing plate 4 by attachment means including a pair of vertical attachment plates 20, 21 made of thick plate steel and forming an angle support. One of the plates 21 is directly welded to the cylinder 19 while the other plate 20 is attached to the cylinder 19 by means of vertical ribs 22, 23. The supports 7a, 7b, 7c, 7d are closed at their upper and lower ends by a pair of welded plates 24, 25, respectively, FIG. 7. The angle support is firmly attached to the indexing plate 4 by means of bolts 26 and pins 27.

As shown in enlarged form in FIG. 7, the cylinder 19 is attached to the rib 22 which is welded to the support plate 20. The support plate 20 is attached to the indexing plate 4 by the bolts 26.

One of the jacks 8a, 8b, 8c, 8d, referred in FIG. 7 as jack 8 is formed of a cylindrical body 30 whose lower support or foot 30' is flat, and which is adapted to slide in a guide cylinder 31. The cylindrical body 30 is extended at its upper portion by a trapezoidal thread 32 around a cylindrical rod 33 forming a guide within the cylinder 19. The cylindrical rod 33 includes at its top a washer 34 fixed by a screw 35. The screw 35 passes vertically through the washer 34 into the cylindrical rod 33.

The cylindrical rod 33 passes through the upper plate 24 of the support 7 through a bore 36. The lower face 34' of the washer 34 is adapted to come in contact and form a stop on the support surface 37 around the bore 36 on the upper face of the plate 24.

The lower face 34' of the washer 34 may be adjusted when being assembled in order that the position of the stop formed by the washer 34 and the surface 37 corresponds to a desired height as explained below.

At the lower portion of the cylinder 19 is centered the cylinder 31 which is attached to the cylinder 19 by pins 38 and screws 39 to prevent any rotation. The cylinder 19 and the guide cylinder 31 are separated by shims 40.

In addition, a key 41 attached to the guide cylinder 31 in the axial direction by means of screws 42 cooperates with a longitudinal rib 43 in the cylindrical body 30 and enables the cylindrical body 30 to move in translation while preventing rotational movement thereof. The movement of the jack 8 is by means of a gear 44, centered on the axis of the jack 8 and mounted to a nut 45 in a plurality of grooves 46. The nut 45 is engaged on the portion of the cylindrical body 30 having the trapezoidal thread 32.

The gear 44—nut 45 may, in turning, act on the trapezoidal thread 32 in order to axially displace the cylindrical body 30 but the trapezoidal thread 32 cannot rotate gear 44—nut 45 when the cylindrical body 30 is subjected to an axial force. The upper portion of the nut 45 is in contact with the cylinder 19 through the intermediary of a heavy roller-thrust bearing 47 supporting the axial forces due to the weight of the plate 4 and with the cylinder 31 by a lighter roller bearing 47'. Centering of the nut 45 is achieved by a pair of roller races 48, 49 mounted on the cylinder 19 and the upper end of the guide bushing 31 respectively. The shim 40 enables adjusting the bearings 47 and 47' with respect to the nut 45 when being assembled.

The gear 44 is driven by a worm gear 50 in rotation and enables according to the direction of rotation of the worm gear 50, to raise or lower the cylindrical body 30 of the jack 8.

Finally, the cylinder 19 is provided with grease cocks 59 which enable lubricating the contacting movable surfaces.

The worm gear 50 is mounted in the cylinder 19 on bearings, not shown, at the ends of the worm gear 50. The housing is closed at one end by a rear cover and at its other end a cover which allows passing a channelled end of the worm 50 which is driven by a key, not shown.

The foot 30' of the cylindrical body 30 of the jack 8 rests on the upper face 60 of a member 61, made of steel and very rigid, of the rolling or movable shoe 9, FIGS. 7 and 8. The movable shoe 9 is provided with a longitudinal stop 62 to define the longitudinal position of said shoe 9 with respect to the jack 8. Under the member 61 is a shoe 63 provided with rollers 64. The member 61 has a pair of lateral guide members 65 and 66 mounted thereto by means of screws 67. The guide members 65 and 66 are on either side of the rail 11 and guide the movable shoe 9. The guide member 66 is provided with a locking screw 68 to lock the movable shoe 9 at any point along the rail 11.

The member 61 is provided with sheet plate closures 69, 70 at the front and rear of the movable shoe 9. Each of the sheet plates 69, 70 is provided with wipers 71, 72, made of synthetic rubber, which are provided to clean the rolling surface 10 of the rail 11 of all chips or dust which would cause damage to the rolling surface 10 by crushing action of the rollers 64.

In operation, when the support jacks 8a, 8b, 8c, 8d are extended, that is, when the cylindrical body is extended beyond the guide bushing 31, the lower face 34' of the washer 34 at the top of the cylindrical rod 33 is in contact and forms a stop on the support surface 37.

The overall height of the jacks 8a, 8b, 8c, 8d in this position with the feet 30' resting on the faces 60 of the movable shoes 9a, 9b, 9c, 9d, is such that the load of a workpiece whose center of gravity is shifted the maximum distance allowable with respect to the axis of the plate 4, will not cause tipping of the plate 4. The precise adjustment of this height for the four jacks is obtained once and for all by selecting the thickness of the washers 34 in assembly.

Once this adjustment has been made, it is possible, by raising the jacks 8, to have the plate 4 resting solely on the support 6 and the bed 6', in order to change the position of the plate 4.

When there is placed on the circular indexing plate 4 a workpiece having a heavy unbalance after having positioned the plate 4 for machining, the movable shoes 9 are moved into contact with the jacks 8 by their longitudinal positioning stops 62, and the four jacks are lowered on the movable shoes 9 until the stop formed by the washer 34 is in contact with the support surface 37. In this position, the jacks relieve the support 6 by transmitting directly to the foundation pit of the machine tool the unbalance through the intermediary of the shoes 9 and the rails 11. It is then possible to machine the first face without straightening or truing up of the reference faces of the workpiece as was previously necessary.

In order to machine the other faces, the rotating plate 4 is moved in multiples of 90°. In order to do this, the shoes 9a, 9b, 9c, 9d are blocked on the rails 11a, 11b with the aide of the locking screws 68, the jacks are raised such that the plate 4 rests only on the support 6. The plate 4 is then rotated by a multiple of 90° in order to place it in the desired position. The jacks 8 undergo a circular movement with the plate 4, but at the end of the 90° multiple, the jacks are always positioned above the shoes 9a, 9b, 9c, 9d on which they may be relowered until the washer 34 comes in stopping contact on the support face 37.

Thus, it is possible to perform all the work of milling, boring or drilling by angular movements of the indexing plate 4 under the conditions set forth above, even on workpieces having a heavy unbalance. It is noted, specifically that the machining by reversing the workpiece by means of the indexing plate 4 may be performed with very high tolerances.

For certain application, it is foreseen to supply the jacks with electric contacts which are only closed when the jacks are raised a sufficient height to allow rotation of the plate 4. These contacts would only allow rotation when they are closed in order to prevent any false movements.

An alternative embodiment of the apparatus consists in positioning the shoes 9a, 9b, and 9c, 9d, respectively, by linking bars 55, figure 1, each pair of rolling shoes then forming a carriage which facilitates positioning the shoes 9.

While various changes may be made in the details of the preferred embodiments of the invention as set forth above, it is to be understood that these alternatives are within the spirit and scope of the present invention. For example, the jacks may be mounted on the movable shoes to support the periphery of the plate at suitable support surfaces thereon.

What I claim is:

1. A workpiece support for a machine tool comprising, a plurality of horizontal support surface means, a support member located adjacent said support surface means, an indexing plate, means mounting said indexing plate on said support member for indexible rotation about a vertical axis, a plurality of vertically adjustable jack means, a plurality of supporting locations around the periphery of said plate, means for adjusting each of said jack means to an individually discrete predetermined extension to extend between a corresponding one of said support surface means and a different one of said plate-supporting locations to support said plate while in a first indexable position, means for retracting said jack means to permit said plate to be rotatably indexed, and means for reextending each of said jack means to its corresponding predetermined extension for supporting the plate at its supporting locations from said support surface means while said plate is in a second indexable position.

2. A workpiece support as recited in claim 1 wherein said jack means are mounted in said plate and include vertically movable feet which are capable of contacting said support surface means and stop means formed between said plate and said jack means to limit the travel of said jack to said predetermined extension.

3. A workpiece support as recited in claim 1 wherein said jack means are used in pairs and have their axis symmetric with respect to the axis of said plate.

4. A workpiece support as recited in claim 1 wherein said jack means are positioned at equal angles about a circle coaxial with said plate, said support surface means being on a plane parallel to said plate.

5. A workpiece support as recited in claim 1 wherein said plate and said support member are movable on a bed and said support surface means are mounted on rails parallel to said bed.

6. A workpiece support as recited in claim 5 wherein said support surface means are provided by support shoes movable on rails, said support shoes being provided with means to lock said shoes to said rails.

7. A workpiece support as recited in claim 5 wherein four jack means are provided in the plate whose axes pass through the plane of the plate at the corners of a square centered on the axis of rotation of said plate, said support surface means being provided by four support shoes mounted in pairs on said rails.

8. A workpiece support for a machine tool as recited in claim 6 wherein said support shoes include positioning means for determining the spacing between shoes on a given rail.